United States Patent [19]
Tai

[11] Patent Number: 5,653,637
[45] Date of Patent: Aug. 5, 1997

[54] EXPANDABLE CONTROLLERS CAPABLE OF CONNECTING IN SERIES TO A CONTROL DECK OF A VIDEO GAME MACHINE

[75] Inventor: Chiao-Yen Tai, Hsinchu, Taiwan

[73] Assignee: United Microelectronics Corp., Hsinchu, Taiwan

[21] Appl. No.: 439,969

[22] Filed: May 12, 1995

[51] Int. Cl.$^6$ ........................................... A63F 9/24
[52] U.S. Cl. ........................... 463/36; 273/148 B
[58] Field of Search ................ 463/36–39; 273/435, 273/438, 148 B; 345/156, 157, 158, 161, 162, 163, 167

[56] References Cited

U.S. PATENT DOCUMENTS

| 4,588,187 | 5/1986 | Dell | 273/148 B X |
| 5,245,320 | 9/1993 | Bouton | 273/148 B X |
| 5,396,225 | 3/1995 | Okada et al. | 273/148 B X |
| 5,421,590 | 6/1995 | Robbins | 273/148 B X |

FOREIGN PATENT DOCUMENTS

| 6-142338 | 5/1994 | Japan | 273/435 |
| 1813466 | 5/1993 | Russian Federation | 273/438 |
| 9423811 | 10/1994 | WIPO | 273/148 B |

*Primary Examiner*—Jessica Harrison
*Assistant Examiner*—Michael O'Neill
*Attorney, Agent, or Firm*—Ladas & Parry

[57] ABSTRACT

An expandable controller for a video game machine. The expandable controller is connectable in series to a control deck of a video game machine. The expandable controller includes a keypad. A plurality of key-switches of the keypad generates key-pressed status signals corresponding to key-pressed status of the plurality of key-switches. An input port of a key-pressed status control circuit connected to the keypad receives the key-pressed status signals. The key-pressed status control circuit also receives a locking signal supplied by the control deck. A shift register is provided with a data input port, a clock input port, a reset input port and a data output port. The reset input port of the shift register is connected to the output port of the key-pressed status control circuit for receiving the key-pressed status signals from the keypad. A data read signal supplied by the control deck is inputted to the clock input port of the shift register to retrieve data from the shift register through the data output port.

10 Claims, 3 Drawing Sheets

EXPANDABLE CONTROLLERS CAPABLE OF CONNECTING IN SERIES TO A CONTROL DECK OF A VIDEO GAME MACHINE

BACKGROUND OF THE INVENTION

1. Field of the Invention

The present invention relates to controllers for a video game machine. In particular, the present invention relates to expandable controllers for a video game machine. More particularly, the present invention relates to expandable controllers which are series-connected for a video game machine without having to change the architecture of the video game machine.

2. Description of Prior Art

Video game machines are popular with today's families. As shown in FIG. 1, a video game machine generally includes a control deck 10 provided With two adapters 11 and 12 for two controllers 21 and 22. A game cassette (not shown) is typically connected to the control deck 10 for storing programs and data of a video game. Normally, there are only two adapters 11 and 12 for the controllers 21 and 22 provided on the control deck 10 because of the initial cost. That is, a video game machine is generally designed for two players at most. If more than two players want to play the video game machine at the same time, it is necessary to additionally connect a controller expansion unit 30 to the control deck 10 of the video game machine, as shown in FIG. 2. Controller expansion unit 30 is connected to the adapter 11 of the control deck 10. A plurality of controllers 23–25 can then be connected to the control deck 10 by means of the controller expansion unit 30. The use of an expansion unit requires that customers spend additional money to buy a controller expansion unit when they want to play a video game with more than two players. However, if the controller expansion unit 30 can only accommodate a limited number of controllers, customers must then buy another controller expansion unit with a larger capacity to overcome this limitation. These expansion problems can reduce the willingness customers to purchase a video game machine.

SUMMARY OF THE INVENTION

Accordingly, it is a general object of the present invention to provide an expandable controller in which controller expansion problems are eliminated.

It is another object of the present invention to provide an expandable controller which can be connected in series so as to not substantially change the architecture of the control deck of the video game machine.

It is an aspect of the present invention that the expanding controllers are connected in series with each other such that no separate controller expansion unit is needed to connect between a control deck and controllers.

According to the present invention, an expandable controller is connectable in series to a control deck of a video game machine. The expandable controller includes a keypad. A plurality of key-switches of the keypad generates key-pressed status signals corresponding to the key-pressed status of the plurality of key-switches. An input port of a key-pressed status control circuit connected to the keypad receives the key-pressed status signals. The key-pressed status control circuit also receives a locking signal supplied by the control deck. A shift register is provided with a data input port, a clock input port, a reset input port and a data output port. The reset input port of the shift register is connected to the output port of the key-pressed status control circuit for receiving the key-pressed status signals from the keypad. A data read signal supplied by the control deck is inputted to the clock input port of the shift register to retrieve data from the shift register through the data output port.

Other objects, features and advantages of the present invention will become apparent by way of the following detailed description of the preferred but non-limiting embodiment.

BRIEF DESCRIPTION OF THE DRAWINGS

The detailed description is made with reference to the accompanying drawings, wherein.

In all of the drawings, like reference numerals represent the same or similar components of the video game machine utilized for the description of the present invention.

DETAILED DESCRIPTION OF THE PREFERRED EMBODIMENT

Figure 1:
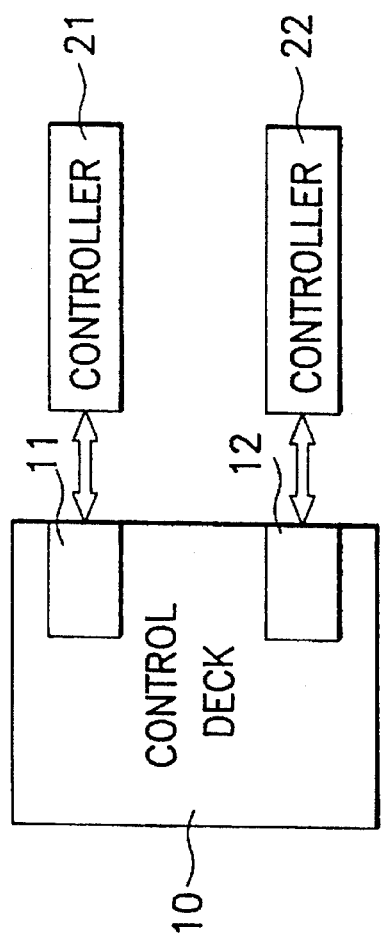
FIG. 1 is a block diagram illustrating the connection of conventional controllers to a video game machine.
Figure 2:
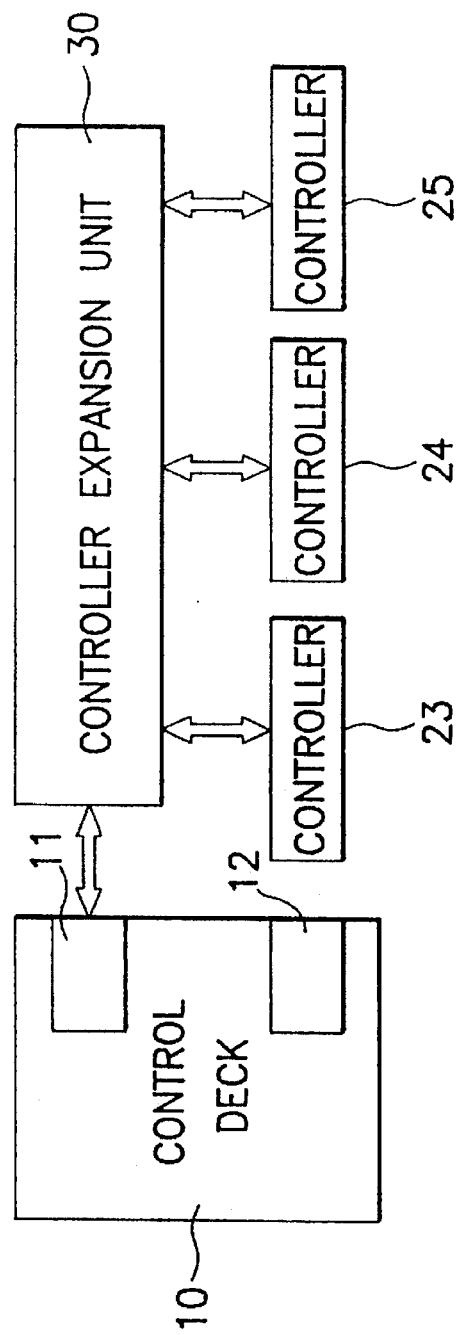
FIG. 2 is a block diagram illustrating the connection of a conventional controllers to a video game machine using an controller expansion unit.
Figure 3:
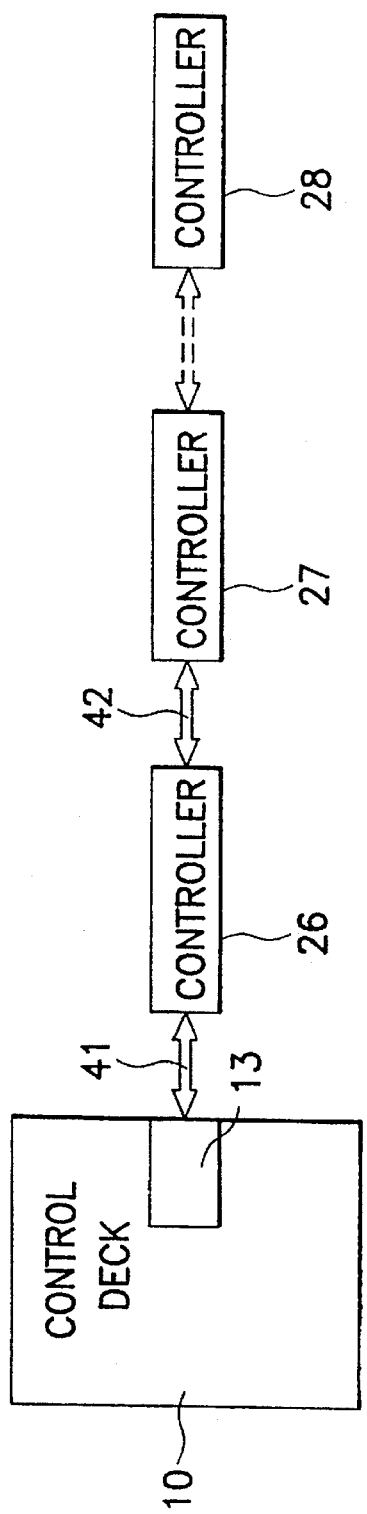
FIG. 3 schematically illustrates a block diagram according to a preferred embodiment of the present invention.

Turning to FIG. 3, instead of a controller expansion unit, a plurality of controllers 26–28 (e.g., joysticks) can be connected in series by buses (e.g., 41 and 42, etc.) according to the present invention. The series-connected controllers are connected to an adapter 13 of control deck 10. Thus the data from the controllers 26–28 can be sequentially retrieved through the adapter 13 by a central processing unit (for example, a Motorola 68000 microprocessor which is not shown in the drawings) in control deck 10.

Figure 4:
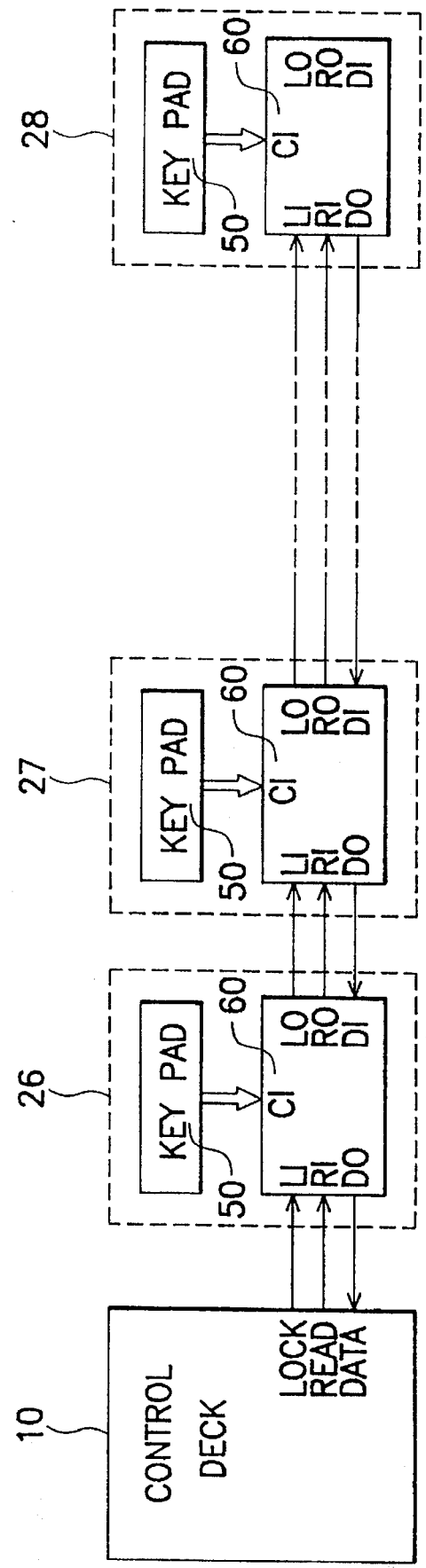
FIG. 4 schematically illustrates a block diagram of a data register according to the present invention.

Referring to FIG. 4, each of the controllers 26–28 includes data register 60 and keypad 50 having a plurality of key-switches. A player may input control signals by pressing the key-switches of keypad 50. The status of the control signal will then be held in data register 60 in response to a locking signal LOCK supplied by the central processing unit. After receiving a data read signal READ including a plurality of pulses from the central processing unit, data registers 60 of each controller sequentially outputs data stored therein to control deck 10. As shown in FIG. 4, each data register is provided with locking signal input/output ports LI and LO, data read signal input/output ports RI and RO, data input/output ports DI and DO and a control status input port CI. Controller 26 receives a locking signal LOCK from the central processing unit by the locking signal input port LI, and outputs the locking signal to its next-stage controller 27 through the locking signal output port LO at the same time. Controller 27, in turn, receives the locking signal by its locking signal input port LI and outputs the locking signal to its next-stage controller, and so forth. While all of controllers 26–28 receive the locking signal, the data registers of each controller will be held. Thereafter, a data read signal supplied by the central processing unit is outputted to the data read signal input port RI of controller 26. Controller 26 outputs the data read signal to its next-stage controller 27 through the data read signal output port RO thereof. Controller 27 receives the data read signal by its data read signal input port RI and outputs the data read signal to its next-stage controller through its data read signal output port RO. Finally, last controller 28 also receives the data read signal through the data read signal input port thereof. As soon as all of the controllers receive the data read signal, the controllers begin to shift the data stored therein back to control deck 10. That is, the data stored in the data register of controller 26 is first sent to the control deck 10 through its data output port DO. The data stored in the data register of controller 27 is then sent to the data register of controller 26, i.e., from the data output port DO of controller 27 to the data input port DI of controller 26. The other controllers repeatedly act in the same manner above until the data stored in the data register of last controller 28 is also sent into control deck 10 through the data output port DO of controller 26.

Figures 5, 6:
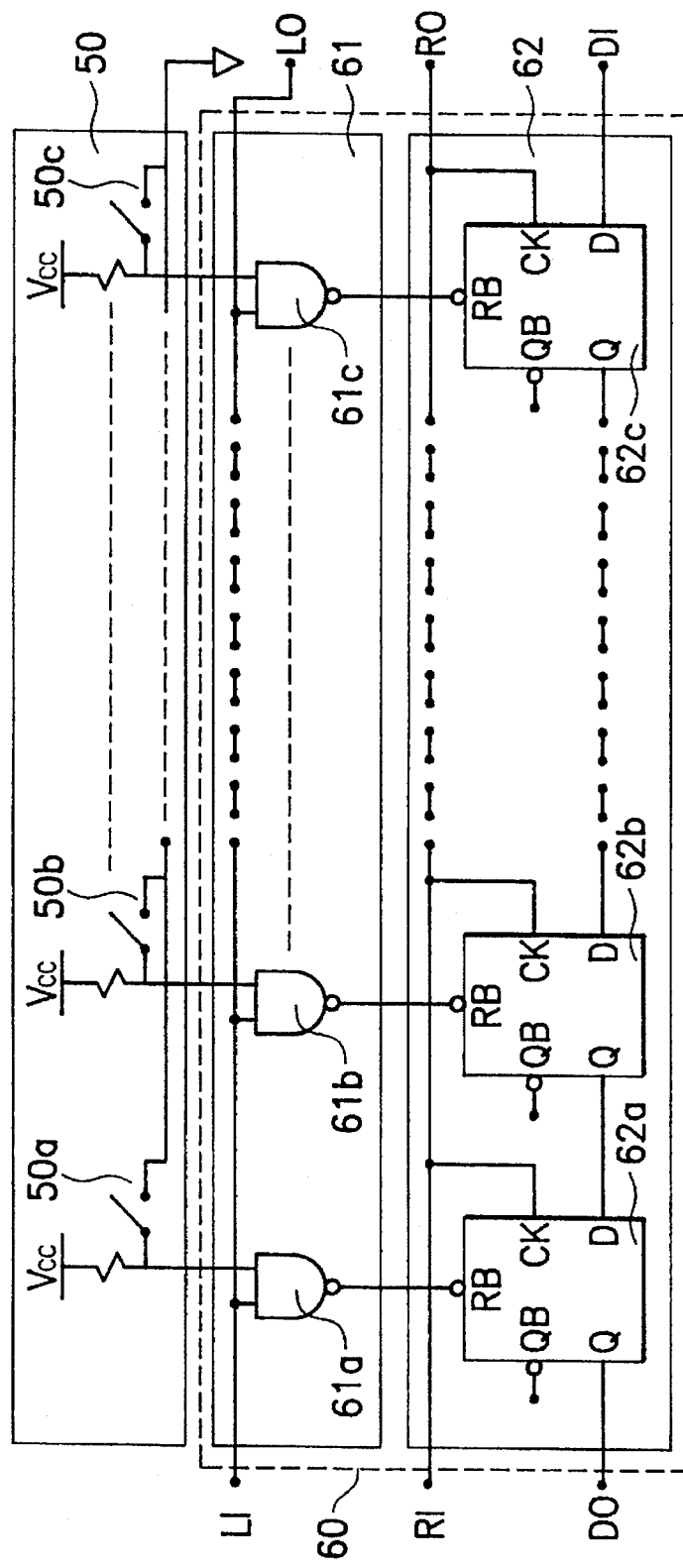
FIG. 5 illustrates a circuit diagram of the data register according to a preferred embodiment of the present invention.
FIG. 6 is a timing diagram of data reading from the controllers in accordance with the present invention.

Reference is now made to FIG. 5, which illustrates a circuit diagram of a controller in accordance with the present invention. The controller includes keypad 50 and data register 60 as described above. Moreover, data register 60 includes key-pressed status control circuit 61 and shift register 62. Key-pressed status control circuit 61 includes a plurality of logical gates 61a–61c in parallel, for example, a plurality of NAND gates as shown in the drawing. Also keypad 50 includes a plurality of key-switches 50a–50c. Each logical gate 61a–61c of key-pressed status control circuit 61 has one of its input ports connected to a current source $V_{cc}$ through a resistor, as well as to ground via a key-switch of keypad 50. The current source $V_{cc}$ and the ground can be provided by the control desk through the buses connecting the control desk and the series-connected controllers. When the controller is operated during a video game, the player consecutively sends control signals to data register 60 by means of keypad 50. Key-pressed status control circuit 61 receives the control signals and also receives locking signal LOCK supplied by the central processing unit; and then key-pressed status control circuit 61 outputs key-pressed status signals to shift register 62.

A data read signal supplied by the central processing unit is provided to drive shift register 62 to send the data to control deck 10. It should be noted that the data read signal must consist of a plurality of pulses corresponding to the flip-flops of the shift registers. For instance, if the shift register of each controller has 8 flip-flops, then a data read signal must have eight consecutive pulses to shift out all of the data in the shift register. If two controllers are connected in series, it means that there are two shift registers connected in series. The data read signal must then have sixteen consecutive pulses to retrieve data from the two serially connected shift registers including 16 flip-flops (8 flip-flops×2).

The data read signal plurality of pulses can be directly generated by the central processing unit. However, this will affect the overall performance of the control deck. Therefore, an additional pulse generator can be employed to generate a plurality of pulses (e.g., 8 pulses) in response to a data read signal READ supplied by the central processing unit. The pulse generator may include a data multiplying parameter register, a counter and a comparator. The data multiplying parameter register stores a data multiplying parameter which is employed for setting the generation period of the locking signal LOCK, i.e., the number of pulses needed and which corresponds to the period for generating one data locking signal. The stored data multiplying parameter represents the number of joysticks connected in series to the control deck. For example, the value of the data multiplying parameter is 2 when there are 2 controllers connected in series to the control deck. The counter calculates the number of the data read signals supplied by the central processing unit. The comparator compares the value of the data multiplying parameter with the value in counter, and sends a locking signal LOCK to the key-pressed status control circuit of each controllers in order to lock the current key-pressed status of the controllers while the data multiplying parameter equals the value contained in counter.

As stated in the above example, when there are two controllers connected in series to the control deck, the value of the data multiplying parameter is set to 2, which indicates that there are 16 bits of data to retrieve (8 bits per controller). Referring now to FIG. 6, the value stored in the data multiplying parameter register is equal to the value in counter only when the central processing unit retrieves data from data register 10 two times (i.e., when 2 data read signals are generated). Then, the comparator sends a data locking signal LOCK to lock the data in the controllers and to clear the count in the counter so as to restart the number count of the pulses. The pulse generator generates 16 pulses (i.e. two times of pulses 1–8 as shown in FIG. 6) in response to two data read signals supplied by the central processing unit while the locking signal LOCK is supplied to lock the current key-pressed status of the controllers. Then, the two 8-bit data D0–D7 of the two controllers are respectively sent to data register 60 in sequence.

As described above, a plurality of 8-bit data D0–D7 from a plurality of controllers connected in series to the control deck can be consecutively retrieved sequentially by setting the value of the data multiplying parameter register with different numbers.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An expandable controller serially connectable to a control deck of a video game machine comprising:

a keypad having a plurality of key-switches for generating key-pressed status signals corresponding to a key-pressed status of said plurality of key-switches; and a data register for receiving the key-pressed status signals from said keypad and holding data corresponding to said key-pressed status signals, said data register consecutively outputting data stored therein to said control deck in sequence in response to a data read signal from said control deck, wherein said data register includes:

a key-pressed status control circuit, said key-pressed status control circuit including:

a key-pressed status control circuit input port connected to said keypad for receiving said key-pressed status signals, means for receiving a locking signal supplied by said control deck, and a key-pressed status control circuit output port; and a shift register, said shift register including:

a reset input port connected to the key-pressed status control circuit output port for receiving the key-pressed status signals from said keypad, a data input port, a data output port coupled to said data input port, and a clock input port responsive to a data read signal supplied by said control deck for retrieving data from said shift register through the data output port.

2. The expandable controller as claimed in claim 1 wherein said key-pressed status control circuit includes a plurality of logical gates connected in parallel, each of said plurality of logical gates receiving a locking signal supplied by said control deck and a corresponding one of said key-pressed status signals and generating a control signal to said shift register.

3. The expandable controller as claimed in claim 1 wherein said shift register includes a plurality of flip-flops connected in series, shift register outputting data stored therein to said control deck in response to said data read signal.

4. The expandable controller as claimed in claim 2 wherein said plurality of logical gates are NAND gates.

5. The expandable controller as claimed in claim 3 wherein said data read signal includes a plurality of pulses corresponding to a bit width of said expandable controller.

6. An expandable controller serially connectable to a control deck of a video game machine comprising:

a keypad having a plurality of key-switches for generating key-pressed status signals corresponding to a key-pressed status of said plurality of key-switches;

a key-pressed status control circuit, said key-pressed status control circuit including:

a key-pressed status control circuit input port connected to said keypad for receiving said key-pressed status signals, means for receiving a locking signal supplied by said control deck, and a key-pressed status control circuit output port; and a shift register, said shift register including:

a reset input port connected to the key-pressed status control circuit output port for receiving the key-pressed status signals from said keypad, a data input port, a data output port coupled to said data input port, a clock input port responsive to a data read signal supplied by said control deck for retrieving data from said shift register through the data output port.

7. The expandable controller as claimed in claim 6 wherein the key-pressed status control circuit input port connects to a current source through a resistor and to ground via one of said plurality of key-switches.

8. The expandable controller as claimed in claim 6 wherein the data input port is connected to a data output port of an adjacent serially connected expandable controller for shifting data from said adjacent serially connected expandable controller into said shift-register at a rising edge of said data read signal.

9. A method for connecting a plurality of expandable controllers to a control deck of a video game machine, each of said plurality of expandable controllers including a keypad and a data register, said data register having a data input port and a data output port, said method comprising the steps of:

connecting said data output port of a first one of said plurality of expandable controllers to a data input port of said control deck;

connecting each remaining expandable controller in series with said first one of said plurality of expandable controllers such that a data output port of said each remaining expandable controller is connected to a data input port of a serially adjacent expandable controller;

inputting control signals to each of said data registers of said plurality of expandable controllers by said keypad;

inputting a locking signal supplied by said control deck to each of said data registers of said plurality of expandable controllers simultaneously to hold the status of said data registers; and inputting a data read signal supplied by said control deck to each of said data registers to consecutively retrieve to said control deck in sequence data stored in each of said data registers of said plurality of expandable controllers in response to said data read signal.

10. The method for connecting a plurality of expandable controllers to a control deck of a video game machine as claimed in claim 9 wherein said data read signal includes a plurality of pulses.

* * * * *